(12) United States Patent  (10) Patent No.: US 8,547,509 B2
Moon et al.  (45) Date of Patent: Oct. 1, 2013

(54) TRANSFLECTIVE TYPE LIQUID CRYSTAL DISPLAY DEVICE AND METHOD OF FABRICATING THE SAME

(75) Inventors: JongWon Moon, Anyang-si (KR); SuSeok Choi, Seongnam-si (KR); SangHo Choi, Gunpo-si (KR)

(73) Assignee: LG Display Co., Ltd., Seoul (KR)

( * ) Notice: Subject to any disclaimer, the term of this patent is extended or adjusted under 35 U.S.C. 154(b) by 627 days.

(21) Appl. No.: 11/319,732

(22) Filed: Dec. 29, 2005

(65) Prior Publication Data

US 2007/0002224 A1 Jan. 4, 2007

(30) Foreign Application Priority Data

Jun. 30, 2005 (KR) ........................ 10-2005-0057596

(51) Int. Cl.
*G02F 1/1335* (2006.01)

(52) U.S. Cl.
USPC ......................................... 349/114; 349/113

(58) Field of Classification Search
USPC ................................................. 349/113–114
See application file for complete search history.

(56) References Cited

U.S. PATENT DOCUMENTS

| | | | |
|---|---|---|---|
| 5,920,084 A * | 7/1999 | Gu et al. ........................ | 257/59 |
| 6,734,935 B2 * | 5/2004 | Kim et al. ..................... | 349/114 |
| 6,853,421 B2 * | 2/2005 | Sakamoto et al. ............ | 349/114 |
| 2002/0105614 A1 * | 8/2002 | Nakayama et al. ........... | 349/143 |
| 2003/0112391 A1 * | 6/2003 | Jang et al. ..................... | 349/114 |
| 2004/0036827 A1 * | 2/2004 | Tsuda et al. ................... | 349/114 |
| 2004/0048546 A1 * | 3/2004 | Sakamoto et al. ............ | 445/24 |
| 2004/0141112 A1 * | 7/2004 | Kang ............................. | 349/113 |
| 2004/0141116 A1 * | 7/2004 | You .............................. | 349/113 |
| 2004/0233359 A1 * | 11/2004 | Nam et al. ..................... | 349/114 |
| 2005/0174517 A1 * | 8/2005 | Kim et al. ..................... | 349/114 |
| 2005/0213002 A1 * | 9/2005 | Wen et al. ..................... | 349/114 |
| 2005/0231666 A1 * | 10/2005 | Kim et al. ..................... | 349/114 |

FOREIGN PATENT DOCUMENTS

KR 10-0824015 A 4/2008

* cited by examiner

*Primary Examiner* — Jessica M Merlin
(74) *Attorney, Agent, or Firm* — Birch, Stewart, Kolasch & Birch, LLP

(57) ABSTRACT

A transflective type LCD device and a method of fabricating the same are discussed. According to an embodiment of the present invention, the transflective type LCD device includes a plurality of gate lines and a plurality of data lines formed on a first substrate to define at least one pixel region having a reflection area and a transmission area, a thin film transistor formed on a crossing point of the plurality of gate lines and the plurality of data lines, a first insulating layer formed on the first substrate including the thin film transistor, a pixel electrode formed on the first insulating layer and electrically connected with the thin film transistor, a second insulating layer formed corresponding to the reflection area on the pixel electrode and having a predetermined dielectric constant, and a reflection plate formed on the second insulating layer.

10 Claims, 6 Drawing Sheets

TRANSFLECTIVE TYPE LIQUID CRYSTAL DISPLAY DEVICE AND METHOD OF FABRICATING THE SAME

The present application claims, under 35 U.S.C. §119, the priority benefit of Korean Patent Application No. 10-2005-0057596 filed Jun. 30, 2005 in Republic of Korea, the entire contents of which are herein fully incorporated by reference.

BACKGROUND OF THE INVENTION

1. Field of the Invention

The present invention relates to a liquid crystal display (LCD) device, and more particularly, to a transflective type liquid crystal display device and method of fabricating the same that can improve picture quality.

2. Description of the Related Art

Generally, LCD devices are flat panel display device having advantages, such as a relatively small size, slim profile, and low power consumption. Accordingly, LCD devices are commonly used in mobile computers, such as notebook computers, office automation machines, and audio/video machines.

The LCD device displays images by manipulating transmission of light through a liquid crystal material having a dielectric anisotropy by controlling an electric field induced to the liquid crystal material. The LCD device makes use of an external light source such as a backlight or surrounding light. Thus, this LCD technique is in contrast to other display devices such as electro-luminescence (EL) devices, light emitting diode (LED) devices and the like, which emit light on their own.

The LCD devices may be classified, according to ways in which light is used, into two different categories: transmission type LCD devices and reflection type LCD devices.

A transmission type LCD device includes a liquid crystal panel having a liquid crystal layer interposed between two substrates, and a backlight unit supplying the light to the liquid crystal panel.

FIG. 1 is a view schematically showing a structure of a transmission type LCD device according to the related art. Referring to FIG. 1, the transmission type LCD includes: a lower substrate 102 having thin film transistors (TFTs) each functioning as a switching element formed at a crossing point of a plurality of gate lines and data lines; an upper substrate 101 facing the lower substrate 102 and having a black matrix (BM) layer, a color filter layer, and a common electrode formed thereon; a liquid crystal layer 103 interposed between the lower and upper substrates 102 and 101; a first polarizing plate 105 attached on the lower substrate 102; a second polarizing plate 104 attached on the upper substrate 101; and a backlight assembly 106 generating light and supplying the light towards the first polarizing plate 105.

In the related art transmission type LCD device having the foregoing construction, a TFT is turned on in response to a scanning signal, and accordingly, an angle of liquid crystal molecules of the liquid crystal layer 103 is changed by a potential difference between a data voltage supplied to a pixel electrode connected with the TFT and a common electrode supplied to the common electrode. Thus, by changing the electric field applied to the liquid crystal molecules having the dielectric anisotropy, the light supplied from the backlight assembly 106 is transmitted or blocked to display an image.

However, in the transmission type LCD device of the related art, it is difficult to realize slimness and lightweight of the LCD device due to a large volume and a heavy weight of the backlight assembly 106. Also, there is a problem that a power consumption of the LCD device is excessively increased because of the power consumption by the backlight assembly 106.

Therefore, researches for a reflection type LCD device not using the backlight assembly have been conducted.

The reflection type LCD device does not have a separate light source and displays an image using natural light (or surrounding light). Thus, since the reflection type LCD device does not need a separate backlight assembly, it has a low power consumption and accordingly is widely used as a portable display device, such as an electronic organizer or a personal digital assistant (PDA).

FIG. 2 is a view schematically showing a structure of the reflection type LCD device according to the related art. In FIG. 2, the reflection type LCD device includes: a lower substrate 202 having thin film transistors (TFTs) functioning as switching elements formed on crossing points of a plurality of gate lines and data lines; an upper substrate 201 facing the lower substrate 202 and having a black matrix (BM) layer, a color filter layer, and a common electrode formed thereon; a liquid crystal layer 203 interposed between the lower substrate 202 and the upper substrate 201; a first polarizing plate 205 attached on the lower substrate 202; a second polarizing plate 204 attached on the upper substrate 201; and a reflection plate 206 disposed below the first polarizing plate 205 and reflecting an external light towards the second polarizing plate 204.

In the related art reflection type LCD device having the foregoing construction, a TFT is turned on in response to a scanning signal, and accordingly, an angle of liquid crystal molecules of the liquid crystal layer 203 is changed by a potential difference between a data voltage supplied to a pixel electrode connected with the TFT and a common electrode supplied to the common electrode. Thus, by changing the electric field applied to the liquid crystal molecules having the dielectric anisotropy, the natural/surrounding light reflected by the reflecting plate 208 is transmitted or blocked to display an image.

In the reflection type LCD device having the foregoing construction, when a plurality of TFTs are turned on by a scanning signal applied to a plurality of gate lines, a predetermined data signal is applied to pixel electrodes through the turned-on TFTs. At this time, a common voltage is supplied to the common electrode of the upper substrate 201. Accordingly, the liquid crystal molecules are controlled by the electric field generated between the pixel electrodes and the common electrode to transmit or block light provided and reflected from the outside, whereby a predetermined image is displayed.

However, in the related art reflection type LCD device, when natural light dose not have a sufficient intensity (for example, when the surrounding is dark), the brightness level of a display image is lowered and the displayed information may not be readable, which is problematic.

Hence, a transflective LCD device employing both the advantages of the transmission type LCD and the reflection type LCD has been proposed.

FIG. 3 is a cross-sectional view schematically showing a construction of the transflective LCD device according to the related art. Referring to FIG. 3, the transflective LCD device includes: an upper substrate 310 that is a color filter substrate, a lower substrate 332 that is an array substrate, spaced apart by a predetermined interval from the upper substrate 310; a liquid crystal layer 320 interposed between the upper and lower substrates 310 and 332; and a backlight assembly 340 disposed below the lower substrate 332 and supplying light.

An upper polarizing plate 313 and a lower polarizing plate 336 are disposed on outer surfaces of the upper and lower substrates 310 and 332, i.e., on an upper surface of the upper substrate 310 and a lower surface of the lower substrate 332. The upper and lower polarizing plates 313 and 336 transmit only light parallel to their light transmission axes to convert natural light into a linearly polarized light.

The upper substrate 310 includes a transparent substrate 311, and a color filter and a common electrode 312 formed on the transparent substrate 311. The color filter transmits only a light having a specific wavelength, and the common electrode is supplied with a common voltage The lower substrate 332 includes a transparent substrate 300. On the transparent substrate 300, a TFT is formed. A first passivation layer 334 having a transmission hole 331 is formed on the TFT. A reflection plate 335 is formed on the first passivation layer 334. A pixel electrode 333 is formed to be electrically connected with the TFT. In FIG. 3, reference numeral 332 is a second passivation layer formed to isolate the pixel electrode 333 from the reflection plate 335.

A gate line and a data line are disposed perpendicularly crossing each other on the lower substrate 332 to define a pixel region 'p'.

The pixel region 'p' includes a reflection area 'r' and a transmission area 't'. The reflection area 'r' corresponds to the reflection plate 335, and the transmission area 't' corresponds to the pixel electrode 333 positioned at the transmission hole 331.

Meanwhile, to reduce a difference in a distance where light travels between the transmission area 't' and the reflection area 'r', it is designed such that a cell gap d1 of the transmission area 't' is about twice larger than a cell gap d2 of the reflection area 'r'.

Generally, a phase difference $\delta$ of the liquid crystal layer 320 is obtained by the following formula:

$$\delta = \Delta n \cdot d$$

where $\delta$: phase difference of a liquid crystal, $\Delta n$: refractive index of a liquid crystal, d: cell gap.

Therefore, to reduce a difference in the optical efficiency between the reflection mode (which uses reflection of light) and the transmission mode (which uses the transmission of light), it is required that the cell gap d1 of the transmission area 't' be greater than the cell gap d2 of the reflection area 'r' such that the phase difference value of the liquid crystal layer 320 is maintained constant.

However, although the cell gap d1 of the transmission area 't' is larger than the cell gap d2 of the reflection area 'r', the optical efficiency in the reflection mode may be different from that in the transmission mode, which is problematic. In particular, when the reflection area 'r' and the transmission area 't' are all formed within one pixel region 'p' and the transflective LCD device operates in both the reflection mode and the transmission mode, visibility may be lowered under a bright external light.

Also, since the process for forming the transmission area 't' and the reflection area 'r' having different cell gaps d1 and d2 is very difficult and is complicated, a liquid crystal disclination may be caused due to a step height difference and a high process failure possibility.

Also, in the above structure, the brightness of the reflection area 'r' and the transmission area 't' can be optimized. However, since the cell gap 'd1' of the transmission area 't' is twice greater than the cell gap 'd2' of the reflection area 'r', the transmission mode and the reflection mode have a four times or more difference in the response rate, which is problematic.

In addition, since the cell gap of the transmission area is made twice greater than that of the reflection area, the overall thickness of the LC panel increases.

SUMMARY OF THE INVENTION

Accordingly, the present invention is directed to a transflective LCD device and method of fabricating the same that substantially obviate one or more problems due to limitations and disadvantages of the related art.

An object of the present invention is to provide a transflective type LCD device and a method of fabricating the same in which a concave and convex pattern of a reflection area is formed of a dielectric material to induce a voltage drop in the reflection area so that a retardation value of the reflection area is one-half or about one-half of a retardation value of a transmission area, thereby enhancing the picture quality.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a transflective LCD device according to an embodiment, which includes: a plurality of gate lines and a plurality of data lines formed on a first substrate to define at least one pixel region having a reflection area and a transmission area; a thin film transistor formed on a crossing point of the plurality of gate lines and the plurality of data lines; a first insulating layer formed on the first substrate including the thin film transistor; a pixel electrode formed on the first insulating layer and electrically connected with the thin film transistor; a second insulating layer formed corresponding to the reflection area on the pixel electrode and having a predetermined dielectric constant; and a reflection plate formed on the second insulating layer.

According to an aspect of the present invention, there is provided a method of fabricating a transflective type LCD device. The method includes: forming a gate electrode and a gate line on a first substrate; forming a first insulating layer on the first substrate including the gate line; forming a semiconductor layer on the first insulating layer corresponding to the gate electrode; forming source and drain electrodes on the semiconductor layer; forming a data line crossing the gate line and having a reflection area and a transmission area on the semiconductor layer; forming a second insulating layer on the first substrate including the data line; forming a pixel electrode electrically coupled to the drain electrode on the second insulating layer; forming a third insulating layer having a predetermined dielectric constant on the reflection area on the pixel electrode; and forming a reflection plate on the third insulating layer.

According to another aspect of the present invention, there is provided a display device comprising a plurality of pixel regions defined by a plurality of data lines and gate lines crossing each other on a substrate, each of the pixel regions including a transmission area and a reflection area, wherein a cell gap of the reflection area is substantially the same as a cell gap of the transmission area.

According to another aspect of the present invention, there is provided a display device comprising a plurality of pixel regions defined by a plurality of gate lines and data lines crossing each other on a substrate, each of the pixel regions including a transmission area and a reflection area, wherein each reflection area includes a pixel electrode electrically coupled to a thin film transistor provided in the corresponding pixel region, a dielectric layer formed on the pixel electrode, and a reflection plate formed on the dielectric layer.

According to another aspect of the present invention, there is provided a method for forming a display device, the method comprising forming a plurality of pixel regions defined by a plurality of data lines and gate lines crossing each other on a substrate, each of the pixel regions including a transmission area and a reflection area, wherein a cell gap of the reflection area is substantially the same as a cell gap of the transmission area.

According to another aspect of the present invention, there is provided a method for forming a display device, the method comprising forming a plurality of pixel regions defined by a plurality of gate lines and data lines crossing each other on a substrate, each of the pixel regions including a transmission area and a reflection area, wherein each reflection area includes: a pixel electrode electrically coupled to a thin film transistor provided in the corresponding pixel region, a dielectric layer formed on the pixel electrode, and a reflection plate formed on the dielectric layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
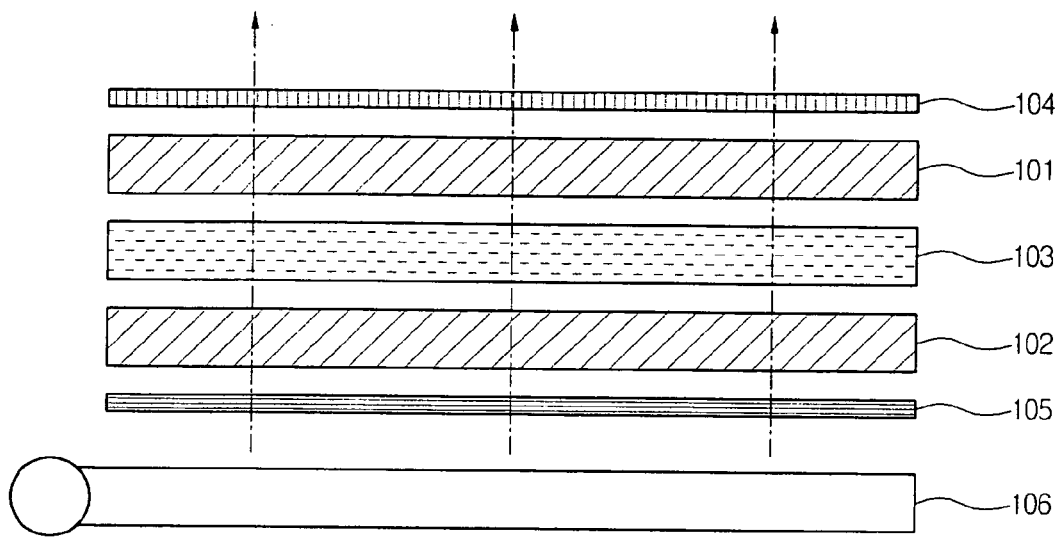
FIG. 1 is a view schematically showing a structure of a transmission type LCD device according to the related art.
Figure 2:
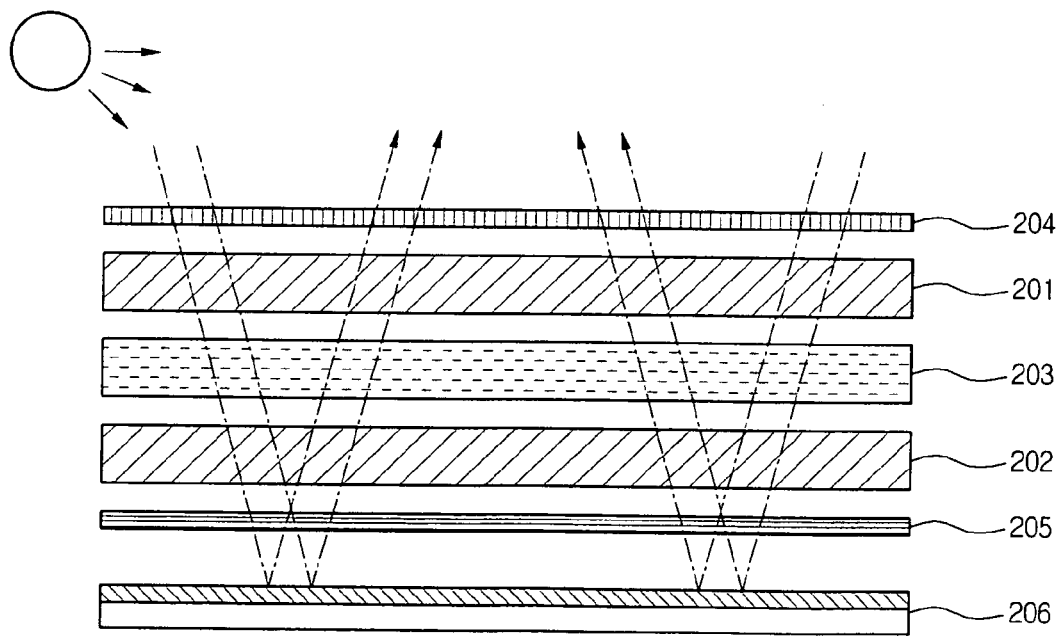
FIG. 2 is a view schematically showing a structure of a reflection type LCD device according to the related art.
Figure 3:
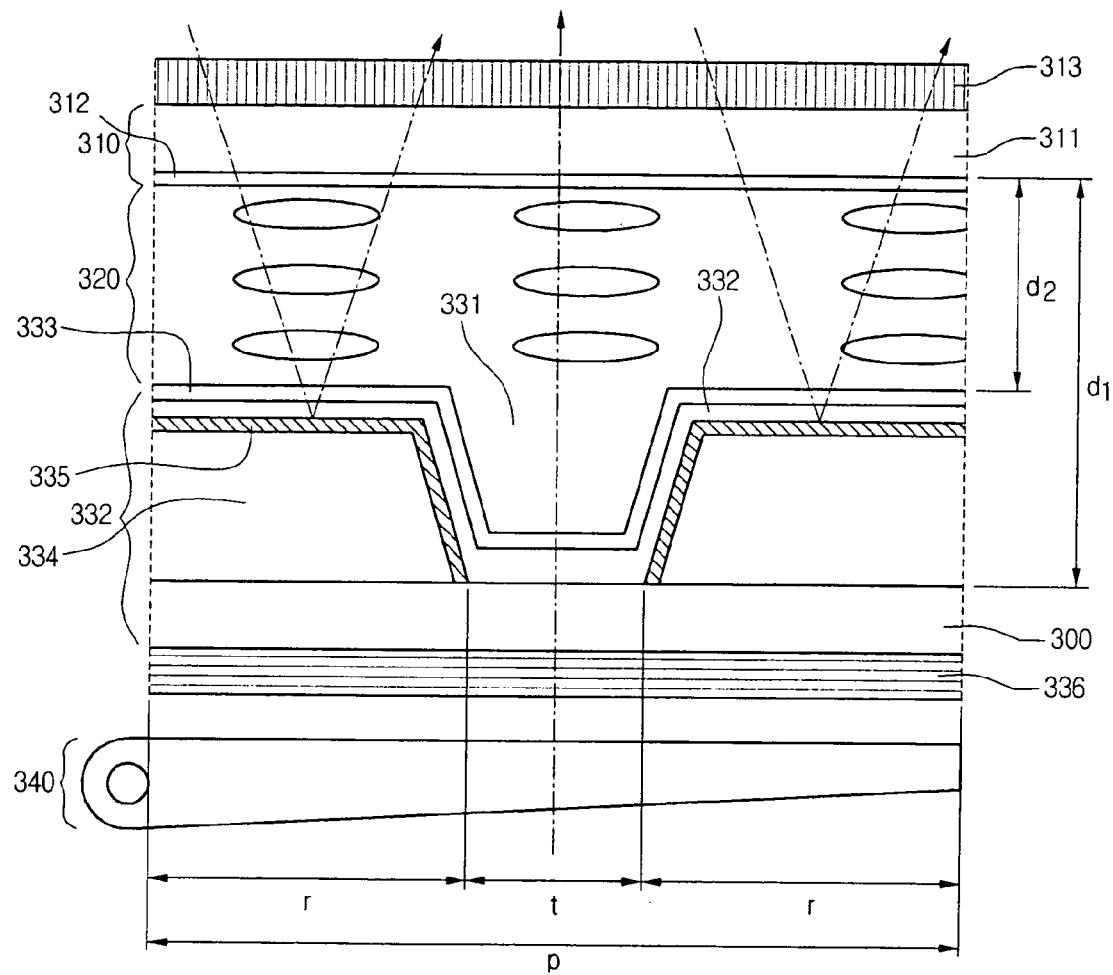
FIG. 3 is a cross-sectional view schematically showing a structure of a transflective type LCD device according to the related art.
Figure 4A:
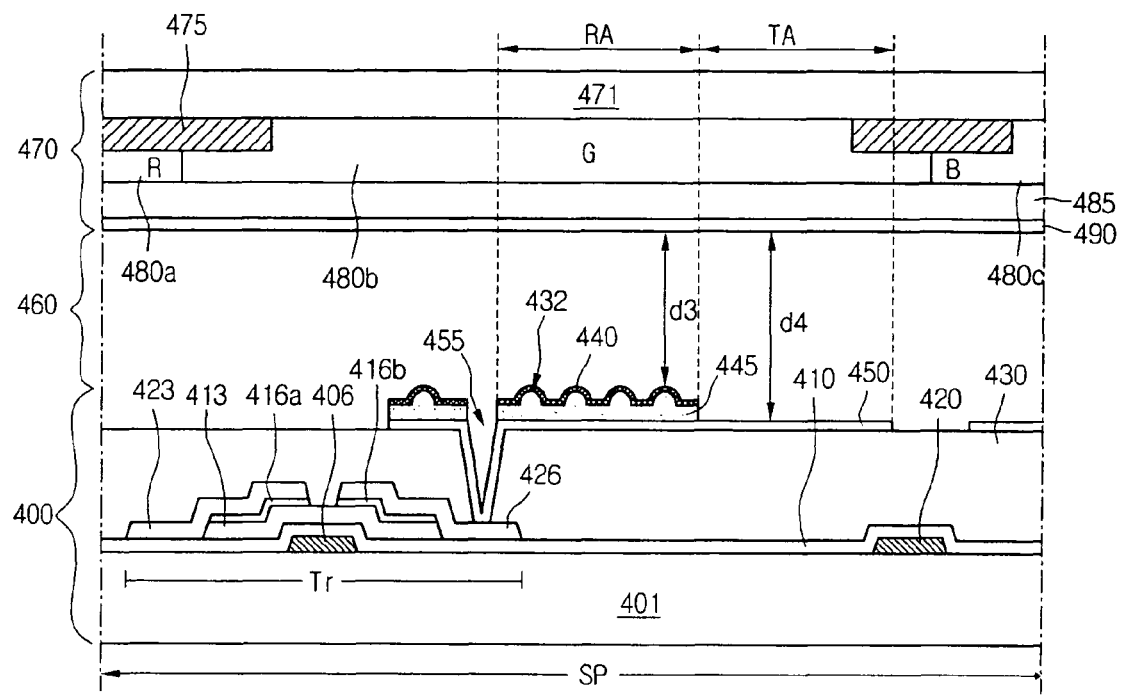
FIG. 4A is a cross-sectional view schematically showing a structure of a transflective type LCD device according to an embodiment of the present invention.
Figure 4B:
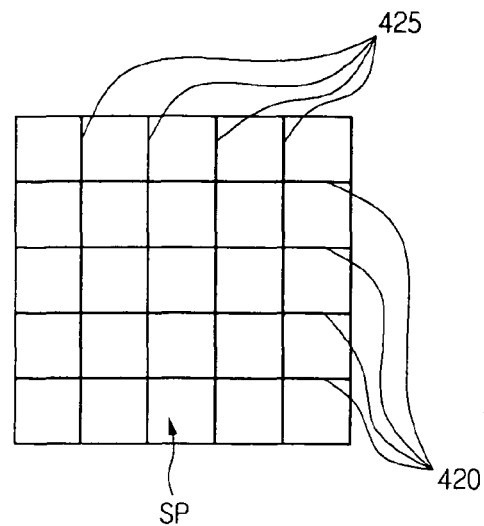
FIG. 4B is a perspective view of a display panel of the LCD device of FIG. 4A, showing data lines and gate lines.

FIG. 4A is a cross-sectional view schematically showing a structure of a transflective type LCD device according to an embodiment of the present invention. In this example, one pixel region 'SP' is shown, but the LCD panel of the LCD device includes a plurality of such pixel regions arranged in a matrix configuration. For example, as shown in FIG. 4B, the LCD panel of FIG. 4A includes a plurality of gate lines 420 and data lines 425 crossing each other to form a plurality of pixel regions SPs in a matrix configuration. Each pixel region SP includes a thin film transistor (Tr) at its crossing portion.

Referring to FIG. 4A, the transflective type LCD device includes a lower substrate 400 that is an array substrate in this example, an upper substrate 470 that is a color filter substrate in this example, and a liquid crystal layer interposed between the lower substrate 400 and the upper substrate 470. The array substrate includes a plurality of data lines 425, gate lines 420, TFTs and pixel electrodes, among other things.

Particularly, in the lower substrate 400, a gate electrode 406 and a gate line 420 are formed on a transparent substrate 401, and a gate insulating layer 410 is formed on the transparent substrate 401 including the gate electrode 406 and the gate line 420. On the portion of the gate insulating layer 410 corresponding to the gate electrode 406, an active layer 413 and an ohmic contact layer 416a, 416b are sequentially formed. Source and drain electrodes 423 and 426 spaced apart from each other are formed on the ohmic contact layer 416a, 416b. The gate electrode 406, the active layer 413, the ohmic contact layer 416a, 416b and the source and drain electrodes 423 and 426 constitute a thin film transistor 'Tr'.

A data line 425 (in FIG. 4B) is also formed on the gate insulating layer 410 together with the source and drain electrodes 423 and 426. The data line 425 is formed integrally with the source electrode 423. A pixel region 'SP' is defined by the gate line 420 and the data line 425. Each pixel region 'SP' includes a transmission area 'TA' and a reflection area 'RA'.

A passivation layer 430 made of, e.g., an organic material having a low dielectric constant is formed on the thin film transistor 'Tr'. The passivation layer 430 has a drain contact hole 455, which partially exposes the drain electrode 426. A pixel electrode 450 is formed at the pixel region 'SP' on the passivation layer 430. The pixel electrode 450 contacts the drain electrode 426 through the drain contact hole 455 and can be formed of one selected from the group consisting of indium tin oxide (ITO) and indium zinc oxide (IZO). A dielectric layer 445 is formed at the-reflection area 'RA' on the pixel electrode 450. The dielectric layer 445 has an upper surface with a concave and convex pattern 432. The dielectric layer 445 is made of, e.g., an organic insulator.

A reflection plate 440 is formed at the reflection area 'RA' on the dielectric layer 445. The reflection plate 440 is formed of a metal having a superior reflectivity, for example, aluminum (Al) or aluminum alloy. The reflection plate 440 also has a concave and convex pattern due to the concave and convex pattern of the dielectric layer 445.

Meanwhile, in the upper substrate, a black matrix 475 is formed on a transparent substrate 471, and red (R), green (G) and blue (B) filters 480a, 480b and 480c are formed on the transparent substrate 471 including the black matrix 475. An over coat layer 485 and a common electrode 490 are sequentially formed on the color filters 480a, 480b and 480c. Each of the color filters 480a, 480b and 480c is formed corresponding to a unit pixel region 'SP', and the black matrix 475 is formed corresponding to the data line.

A liquid crystal layer 460 is interposed between the pixel electrode 450 and the common electrode 490, and liquid crystal molecules of the liquid crystal layer 460 are realigned depending on an electric field controlled by a voltage difference between the pixel electrode 450 and the common electrode 490.

In a reflection mode, the dielectric layer 445 on the reflection area 'RA' forms a capacitance together with the pixel electrode 450 to cause the data voltage supplied to the pixel electrode 450 to drop. The dielectric layer 445 has a dielectric constant of, e.g., about 2-5, and can be formed of, for example, an organic insulating layer such as photo acryl or benzocyclobutene(BCB).

Accordingly, without changing the data voltage supplied to the pixel electrode 450 of the pixel region 'SP', but by using the dielectric layer 445, different electric fields are generated from the reflection area 'RA' and the transmission area 'TA', respectively in the present invention. The different electric fields cause the retardation values of the liquid crystal in the reflection area 'RA' and the transmission area 'TA' to be different. Hence, the final retardation of liquid crystal delay in the reflection area 'RA' becomes consistent with that of liquid crystal in the transmission area 'TA'.

For example, assuming that the retardation value of the transmission area 'TA' is $\lambda/2$, the dielectric layer 445 is formed to have the retardation value of $\lambda/4$ such that a final retardation value in the reflection area 'RA' becomes $\lambda/2$. In other words, since light from the backlight unit passes through the transmission area 'TA' one time and light passes through the reflection area 'RA' two times by the reflection operation, a final electric field of the reflection area 'RA' is decreased using a voltage drop between the dielectric layer 445 and the pixel electrode 450 such that the final retardation value of the reflection area 'RA' becomes equal to or substantially equal to that of the transmission area 'TA'.

Alignment layers are respectively formed on the pixel electrodes 450 and the common electrode 490 to determine the initial alignment state of liquid crystal molecules. Also, other known components are provided in the LCD device of the present invention.

In the transflective LCD device having the above structure, a cell gap 'd3' of the reflection area 'RA' is substantially or nearly equal in thickness to a cell gap 'd4' of the transmission area 'TA'.

In the transflective LCD device thus formed, the data voltage of the reflection area 'RA' is dropped by using the dielectric layer 445, such that the final retardation value of the reflection area 'RA' becomes equal (or substantially equal) to that of the transmission area 'TA', thereby removing difficulties in the manufacturing process and decreasing a process failure in fabricating the array substrate of an LCD device.

Also, since the reflection plate 440 having the concave and convex structure is formed at the reflection area 'RA' on the array substrate, the reflection efficiency is maximized in the reflection mode operation.

In addition, since the cell gaps d3 of the reflection area 'RA' is substantially equal to the cell gap d4 of the transmission area to form a uniform alignment, a disclination is prevented or minimized and the picture quality is effectively improved.

Further, since the cell gaps d1 of the reflection area 'RA' is substantially equal to the cell gap $d_2$ of the transmission area, the response rate in the transmission area 'TA' and the reflection area 'RA' becomes faster, so that an image display delay disappears. Also, since the overall cell gap of the LCD panel can be decreased, products having a slim profile can be manufactured according to the present invention.

A method of fabricating an array substrate of a transflective LCD device according to an embodiment of the present invention will now be described with reference to the accompanying drawings.

FIGS. 5A through 5E are partial sectional views illustrating a method of fabricating an array substrate for a transflective type LCD device according to an embodiment of the present invention. This method is applied to form the array substrate of FIG. 4A as an example, but can be applied to form other array substrates or other LCD or display panel device substrates.

Figure 5A:
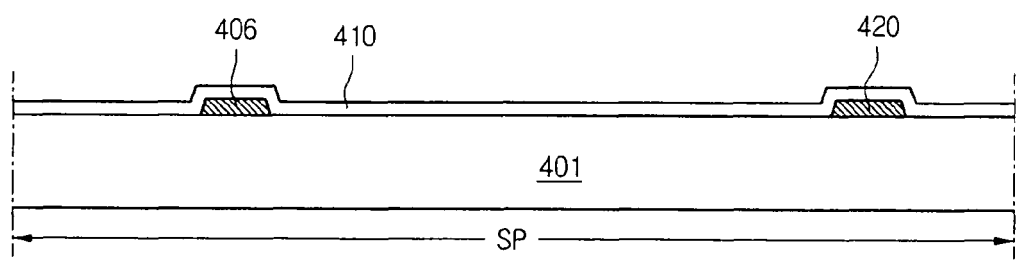
FIGS. 5A through 5E are partial sectional views illustrating a method of fabricating an array substrate for a transflective type LCD device according to an embodiment of the present invention.

Referring to FIG. 5A, a metal film selected from the group consisting of chromium (Cr), aluminum (Al), copper (Cu) and the like is deposited on a transparent substrate 401, and a photoresist film is then coated on the metal film. The metal film is then patterned using a photolithography process (hereinafter referred to as a 'masking process') to form a gate electrode 406 and a gate line 420. At this time, in case the metal film is formed of Al, a molybdenum (Mo) layer may be further deposited on the Al layer and patterned to form a double-layered gate electrode 406.

Thereafter, either silicon nitride ($SiN_x$) or silicon oxide ($SiO_2$) is deposited on the substrate 401 including the gate electrode 406 to form a gate insulating layer 410 on the gate electrode 406 and the gate line 420.

Figure 5B:
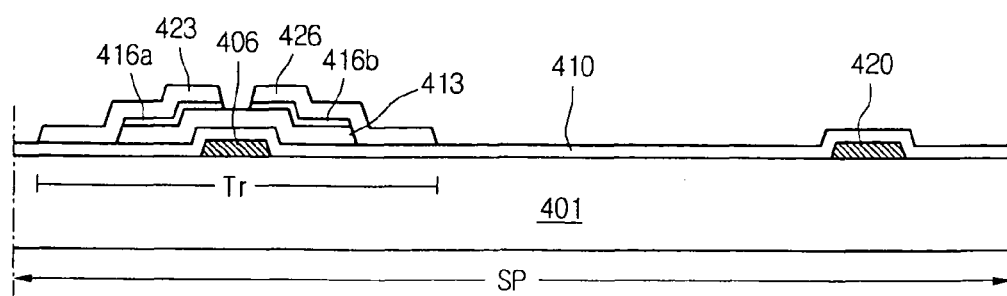

Next, referring to FIG. 5B, an amorphous silicon (a-Si) layer is deposited corresponding to the gate electrode 406 on the gate insulating layer 410, a photoresist film is coated on the amorphous silicon layer, and a masking process is performed to form an active layer 413. Impurities are doped into the active layer 413 to form an amorphous ohmic contact layer 416a, 416b containing impurities.

Thereafter, a metal film selected from the group consisting of Cr, Mo, Al and the like is deposited and patterned to form source and drain electrodes 423 and 426 spaced apart by a predetermined distance from each other interposing the gate electrode 406 therebetween on the ohmic contact layer 416a, 416b and at the same time a data line 425 (FIG. 4B) crossing the gate line 420 to define a pixel region 'SP'. The pixel region 'SP' includes at least one transmission area 'TA' generally located at a center or middle area thereof and at least one reflection area 'RA' enclosing (e.g., partially or completely surrounding) the transmission area 'TA'. At this time, the source and drain electrodes 423 and 426 and the data line may be formed in a double-layer structure of Al/Cr or Al/Mo. The active layer 413 and the ohmic contact layer 416a, 416b are sometimes named a 'semiconductor layer'.

Next, a portion of the ohmic contact layer exposed between the source and drain electrodes 423 and 426 is removed to expose the underlying active layer 413, which serves as a channel. As a result, a thin film transistor 'Tr' is formed by the source and drain electrodes 423 and 426, the underlying ohmic contact layer 416a, 416b, the active layer 413 and the gate electrode 406.

Figure 5C:
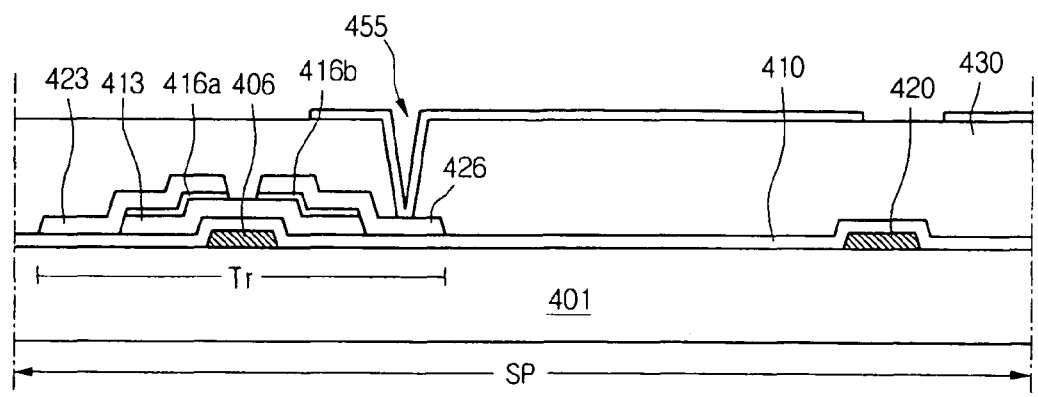

Referring to FIG. 5C, a passivation layer 430 is formed on an entire surface of the substrate including the source and drain electrodes 423 and 426 and the date line. The passivation layer 430 is patterned to have a drain contact hole 455 partially exposing the drain electrode 426.

Thereafter, a pixel electrode 450 is formed of a transparent conductive material such as ITO or IZO, at the pixel area 'SP' on the passivation layer 430. At this time, the pixel electrode 450 contacts the drain electrode 426 through the drain contact hole 455.

Figure 5D:
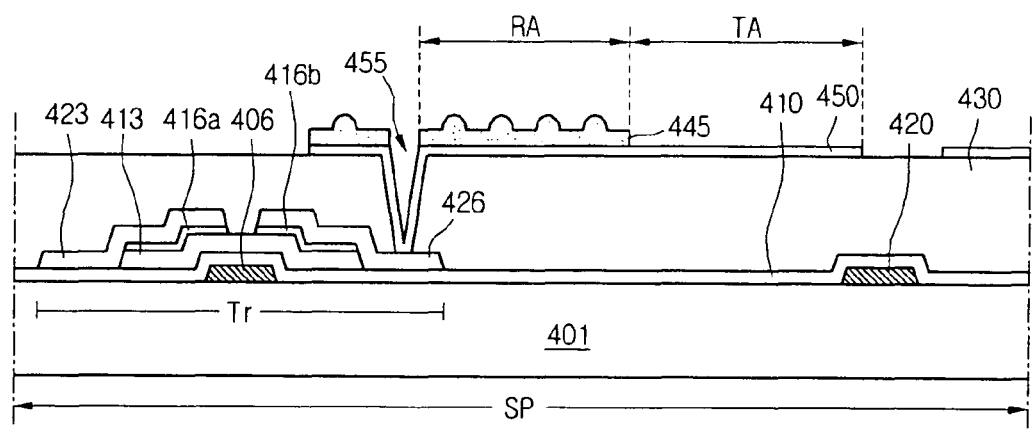

Referring to FIG. 5D, a dielectric layer 445 is formed at a reflection area 'RA' on the pixel electrode 450. The dielectric layer 445 has an upper surface having a concave and convex pattern 432. The dielectric layer 445 has a dielectric constant of, e.g., 2-5, and can be formed of an organic insulating layer such as photo acryl, benzocyclobutene(BCB), or the like, by a photolithography process.

Figure 5E:
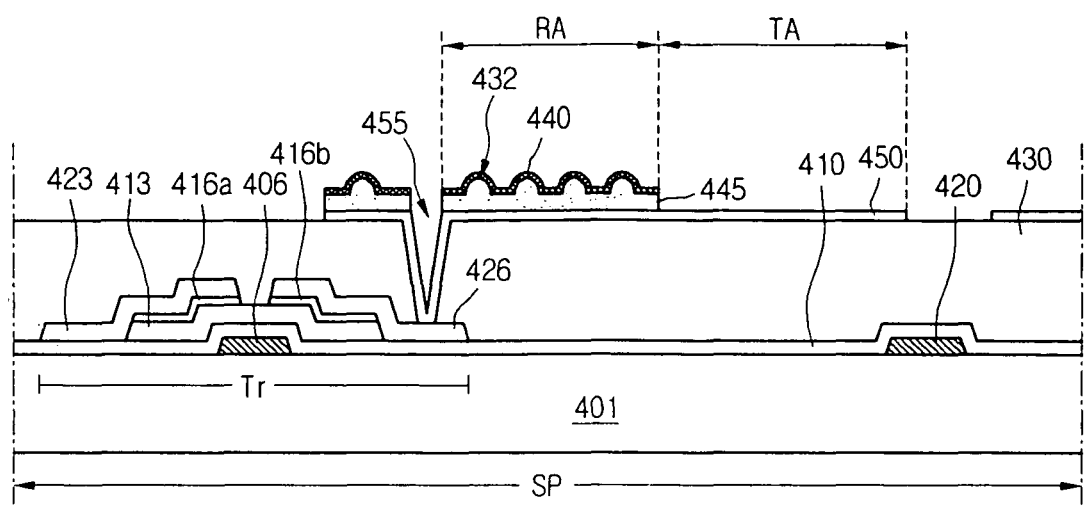

Referring to FIG. 5E, a metal film selected from the group consisting of Al, Al alloy, Ag and Ag alloy is deposited on the entire surface of the passivation layer 430 and is then patterned through a masking process to form a reflection plate

440. The reflection plate 440 is formed on the reflection area 'RA' but is not formed on the transmission area 'TA'. Like the dielectric layer 445, the reflection plate 440 also has an upper surface having a concave and convex pattern.

According to the present invention, instead of the pattern 432, the dielectric layer 445 may have a flat upper surface or other patterns at the upper surface. The patterns at the upper surface of the dielectric layer may be used to vary the dielectric characteristics of the dielectric layer. The reflection plate 440 is formed on the upper surface of the dielectric layer 445 and thus can have a pattern corresponding to the upper surface of the dielectric layer 445.

The transflective LCD device according to the present invention drops the data voltage of the reflection area 'RA' using a dielectric layer such that the final retardation value of the reflection area becomes equal to or substantially equal to that of the transmission area, thereby removing difficulties in the fabrication process and decreasing a process failure in fabricating the array substrate.

Also, since the reflection plate having the concave and convex structure is formed at the reflection area 'RA' on the array substrate, the reflection efficiency is maximized in the reflection mode operation.

In addition, the present invention provides a cell gap d3 of the reflection area that is substantially equal to a cell gap d4 of the transmission area (and not one-half of the cell gap d4) to form a uniform alignment. As a result, a disclination is prevented and the picture quality is improved.

Further, since the cell gap of the reflection area is substantially equal to that of the transmission area, the response rate in the transmission area 'TA' and the reflection area 'RA' becomes faster, so that an image display delay disappears. Also, since the overall cell gap of the LCD panel can be decreased, it is possible to realize products having a slim profile.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A transflective type liquid crystal display (LCD) device comprising:
    a plurality of gate lines and a plurality of data lines formed on a first substrate to define at least one pixel region having a reflection area and a transmission area;
    a thin film transistor formed on a crossing point of the plurality of gate lines and the plurality of data lines;
    a passivation layer formed on the first substrate including the thin film transistor, and having a contact hole;
    a pixel electrode formed at an overall area of the pixel region on the passivation layer and electrically connected with the thin film transistor through the passivation layer;
    a dielectric layer contacting a portion of a top surface of the pixel electrode in the reflection area of the pixel region and around the contact hole and having a dielectric constant of about 2-5;
    a reflection plate contacting an overall area of the dielectric layer;
    a common electrode on an entire area of a second substrate that faces with the first substrate; and
    a liquid crystal layer between the first substrate and the second substrate,
    wherein an entire bottom surface of the pixel electrode directly contacts a flat top surface of the passivation layer, an inner surface of the contact hole and the thin film transistor in the contact hole,
    wherein the dielectric layer comprises an organic insulator and is disposed between the reflection layer and the pixel electrode to form a capacitance which causes a voltage supplied to the pixel electrode to be dropped,
    wherein the dielectric layer has a top surface, the top surface including a plurality of protrusions protruding from the top surface and a plurality of flat surfaces between the protrusions, and
    wherein a first distance between the pixel electrode of the first substrate and the common electrode of the second substrate in the transmission area is substantially identical to a second distance between the reflection plate of the first substrate and the common electrode of the second substrate in the reflection area.

2. The transflective type LCD device according to claim 1, further comprising:
    red, green and blue color filter layers formed on the second substrate facing the first substrate;
    a black matrix formed between the red, green and blue color filter layers; and
    an over coat layer formed on each of the red, green and blue color filter layers.

3. The transflective type LCD device according to claim 1, wherein the transmission area is formed at a center area of the pixel region and the reflection area is formed to enclose the pixel region.

4. The transflective type LCD device according to claim 1, wherein the reflection area has a liquid crystal retardation value corresponding to about one-half of a liquid crystal retardation value of the transmission area by the voltage drop.

5. The transflective type LCD device according to claim 1, wherein the dielectric layer is formed of one of photo acryl and benzocyclobutene(BCB).

6. A method of fabricating a transflective liquid crystal display (LCD) device, the method comprising:
    forming a gate electrode and a gate line on a first substrate;
    forming a gate insulating layer on the first substrate including the gate line;
    forming a semiconductor layer on the gate insulating layer corresponding to the gate electrode;
    forming source and drain electrodes on the semiconductor layer;
    forming a data line crossing the gate line and defining a pixel region including a reflection area and a transmission area on the semiconductor layer;
    forming a passivation layer on the first substrate including the data line, the passivation layer having a contact hole;
    forming a pixel electrode electrically coupled to the drain electrode on the passivation layer through the passivation layer, the pixel electrode being formed at an overall area of the pixel region on the passivation layer;
    forming a dielectric layer contacting a portion of a top surface of the pixel electrode in the reflection area of the pixel region and around the contact hole, the dielectric layer having a dielectric constant of about 2-5;
    forming a reflection plate contacting an overall area of the dielectric layer;
    forming a common electrode on an entire area of a second substrate that faces with the first substrate; and
    forming a liquid crystal layer between the first substrate and the second substrate,
    wherein an entire bottom surface of the pixel electrode directly contacts a flat top surface of the passivation layer, an inner surface of the contact hole and a thin film transistor in the contact hole, wherein the dielectric layer comprises an organic insulator and is disposed between the reflection layer and the pixel electrode to form a capacitance which causes a voltage supplied to the pixel electrode to be dropped, wherein the dielectric layer has a top surface, the top surface including a plurality of protrusions protruding from the top surface and a plurality of flat surfaces between the protrusions, and wherein a first distance between the pixel electrode of the first substrate and the common electrode of the second substrate in the transmission area is substantially identical to a second distance between the reflection plate of the first substrate and the common electrode of the second substrate in the reflection area.

7. The method according to claim 6, further comprising:
forming red, green and blue color filter layers on the second substrate facing the first substrate;
forming a black matrix between the red, green and blue color filter layers; and
forming an over coat layer on the red, green and blue color filter layers.

8. The method according to claim 6, wherein the dielectric layer is formed by a photolithography process.

9. The method according to claim 6, wherein the passivation layer is formed of one of photo acryl and benzocyclobutene (BCB).

10. A transflective type liquid crystal display (LCD) device comprising:
a plurality of gate lines and a plurality of data lines formed on a first substrate to define at least one pixel region having a reflection area and a transmission area;
a thin film transistor formed on a crossing point of the plurality of gate lines and the plurality of data lines;
a passivation layer formed on the first substrate including the thin film transistor;
a pixel electrode formed at an overall area of the pixel region on the passivation layer and electrically connected with the thin film transistor through the passivation layer;
a dielectric layer contacting a portion of a top surface of the pixel electrode in the reflection area of the pixel region and around a contact hole and having a dielectric constant;
a reflection plate contacting an overall area of the dielectric layer;
a common electrode on a second substrate that faces with the first substrate; and
a liquid crystal layer between the first substrate and the second substrate,
wherein the dielectric layer comprises an organic insulator and is disposed between the reflection layer and the pixel electrode to form a capacitance which causes a voltage supplied to the pixel electrode to be dropped,
wherein a first distance between the pixel electrode of the first substrate and the common electrode of the second substrate in the transmission area is substantially identical to a second distance between the reflection plate of the first substrate and the common electrode of the second substrate in the reflection area, and
wherein the dielectric layer has a top surface, the top surface including a plurality of protrusions protruding from the top surface and a plurality of flat surfaces between the protrusions.

* * * * *